UNITED STATES PATENT OFFICE.

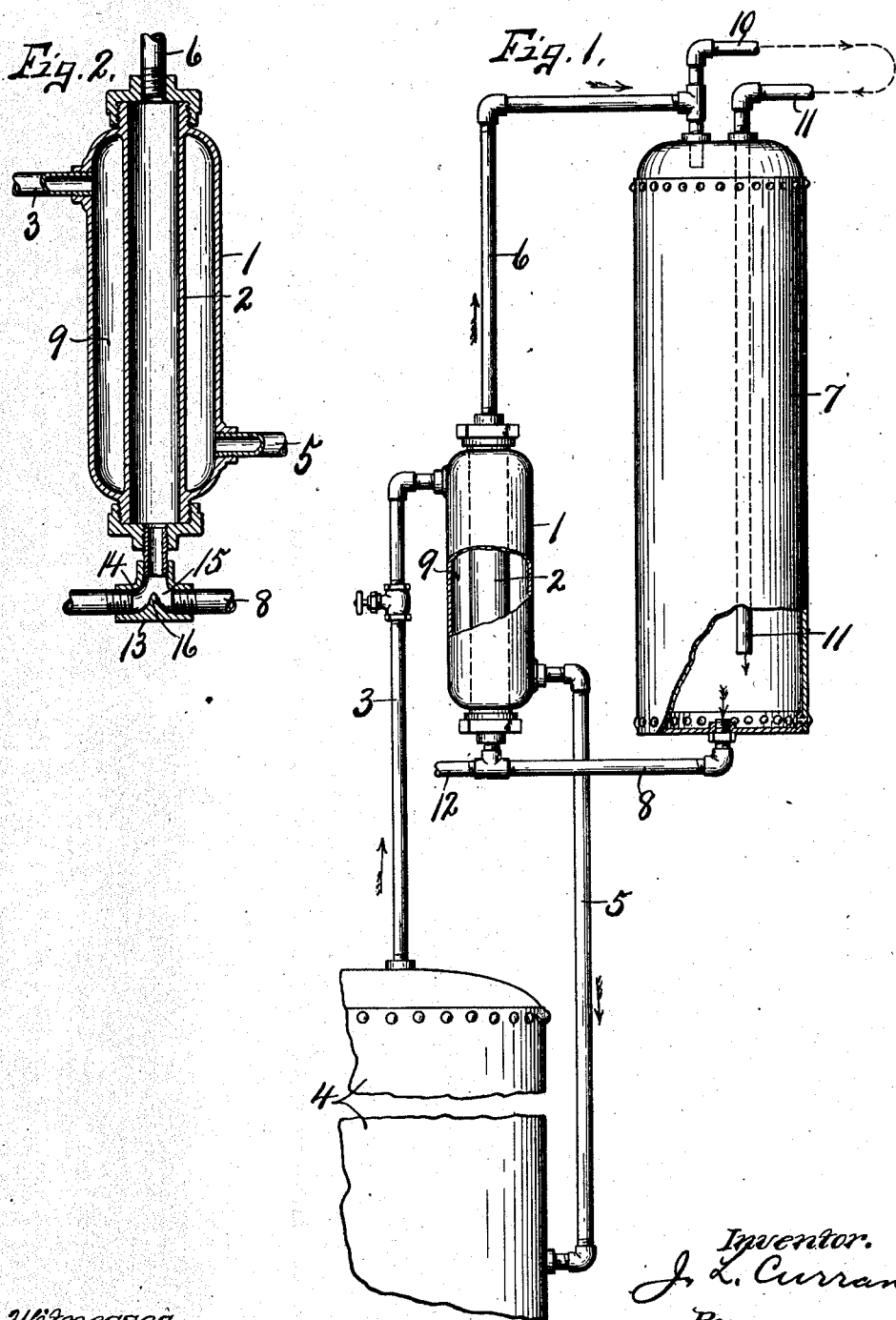

JEREMIAH L. CURRAN, OF SYRACUSE, NEW YORK.

SYSTEM OF HEATING STORAGE-WATER.

No. 923,035.  Specification of Letters Patent.  Patented May 25, 1909.

Application filed April 20, 1907. Serial No. 369,357.

To all whom it may concern:

Be it known that I, JEREMIAH L. CURRAN, of Syracuse, in the county of Onondaga, in the State of New York, have invented new and useful Improvements in Systems of Heating Storage-Water, of which the following, taken in connection with the accompanying drawings, is a full, clear, and exact description.

This invention relates to an improved system of heating storage water in which steam is employed as a heating agent and involves the use of a shell or casing having one chamber in circuit with a steam generator for the circulation of steam and return of the water of condensation and a separate chamber in circuit with a suitable reservoir in which the hot water is to be stored.

My main object is to provide a simple and comparatively inexpensive water-heating medium in the circulating system between a steam generator and storage tank to heat the water in transit through the circulating system and to maintain a reserve of hot water in the reservoir and to thereby obviate the necessity for the usual interior coils of such reservoir which are not only expensive but add materially to the weight and cost of manufacture of the reservoir.

One of the objects, therefore, is to simplify the structure and reduce the cost of the storage tank or reservoir by associating a water heating chamber with a steam heating chamber in such manner that the water absorbs the heat of the steam while in transit through the circulating system.

Other more specific objects and uses will be brought out in the following description.

In the drawings—Figure 1 is an elevation partly in section of a storage tank or reservoir and a portion of a steam generator together with my improved water heater connected in circuit with the steam generator and storage tank. Fig. 2 is a longitudinal sectional view of the water heating device seen in Fig. 1 in which the steam and water chambers are relatively fixed.

In order to demonstrate the practicability of my invention I have shown in Fig. 1 a water heating device consisting of an outer tubular shell —1— and an inner tubular shell —2— arranged lengthwise and centrally within and of somewhat smaller diameter than the interior diameter of the outer shell —1— which latter is connected near one end by a pipe —3— to the steam dome of a suitable steam generator —4— while the opposite end of said outer shell is connected by a pipe —5— to the steam generator —4— usually below the water line so as to establish a complete steam and water circulating system between the outer shell —1— and steam generator.

The inner tubular shell —2— is connected at one end by a pipe —6— to one end of a suitable storage tank —7— and the opposite end of this inner tubular shell —2— is connected by a pipe —8— to the opposite end of said storage tank thereby establishing a complete circulating system between the storage tank and inner tubular shell —2— of the heater.

In the device shown in Figs. 1 and 2 the inner and outer shells —1— and —2— are relatively fixed together by making them integral or otherwise rigidly uniting them and although I have shown the opposite ends of the outer shell —2— as connected in circuit with the storage tank, it is evident that this order of arrangement may be reversed without departing from the spirit of this invention.

As previously stated, the inner tube is of relatively smaller diameter than the interior diameter of the surrounding outer shell —1— leaving an intervening comparatively shallow chamber —9— which is in communication with the steam generator —4— through the medium of the pipes —3— and —5— and is substantially co-extensive with the length of the shells —1— and —2—. This chamber —9— is, therefore, adapted to receive steam from the generator —4— while the inner tubular shell —2— is adapted to receive water and this shell —2— containing the water is, therefore, entirely enveloped by the steam in the chamber —9— thereby heating such water which is delivered upwardly through the pipe —6— into the top of the storage tank —1— and circulates from the bottom of said tank through the pipe —8— into the lower end of said inner tube —2— or as shown in Fig. 1, the pipe —6— may be extended from the tank by an additional pipe —10— to any part of the building or water circulating system where the hot water may be desired and returned through a pipe —11— into the bottom of the tank —7— where the circulation may continue back through the pipe —8— to the water tube —2—.

As shown in Fig. 1, the steam from the generator —4— is delivered into the upper end of the outer shell —1— and chamber —9— where its heat is absorbed by the water in the tube —2— leaving the water of condensation of the steam to return through the pipe —5— to the generator —4—. These tubular shells —1— and —2— constitute a complete water heating device adapted to be attached or connected in any steam circulating system in circuit with any storage tank where it may be desired to hold in reserve a quantity of hot water, and the invention, therefore, lies in the association of two shells one within the other, one of which is connected in circuit with a steam generator while the other is connected in circuit with a storage tank.

The water shell as —2— may be connected by a pipe —12— to any source of water supply not necessary to herein illustrate or describe but for convenience of illustration of the practicability of feeding the water direct to the water tube —2— and also from the reservoir —7— to said water tube, I have shown the pipes —8— and —12— as connected to said water tube by a tee —13— having upwardly converging ways —14— and —15— both of which may deliver simultaneously into the bottom of the tube —2— without creating a back pressure in either one of the pipes —8— or —12—, said branches being separated by a partition —16—.

What I claim is:

1. In a system of heating storage water, a heating shell comprising a pair of tubular sections, one arranged within and formed integral with the other and forming a heating chamber, said inner section of greater length than said outer section whereby the ends of the inner section will project from the ends of the outer section, said inner section having an outlet at one end and an inlet at the other end and constituting a water receiving chamber, and said outer section having an inlet in one side and an outlet in its other side.

2. In a system of heating storage water, a heating shell comprising an inner and an outer section, one arranged within and formed integral with the other and forming a heating chamber, said inner section having an outlet at one end and an inlet at the other end and constituting a water receiving chamber and said outer section having an inlet in one side and an outlet in its other side.

In witness whereof I have hereunto set my hand this 15th day of April 1907.

JEREMIAH L. CURRAN.

Witnesses:
 H. E. CHASE,
 MILDRED M. NOTT.